United States Patent Office 2,848,060
Patented Aug. 19, 1958

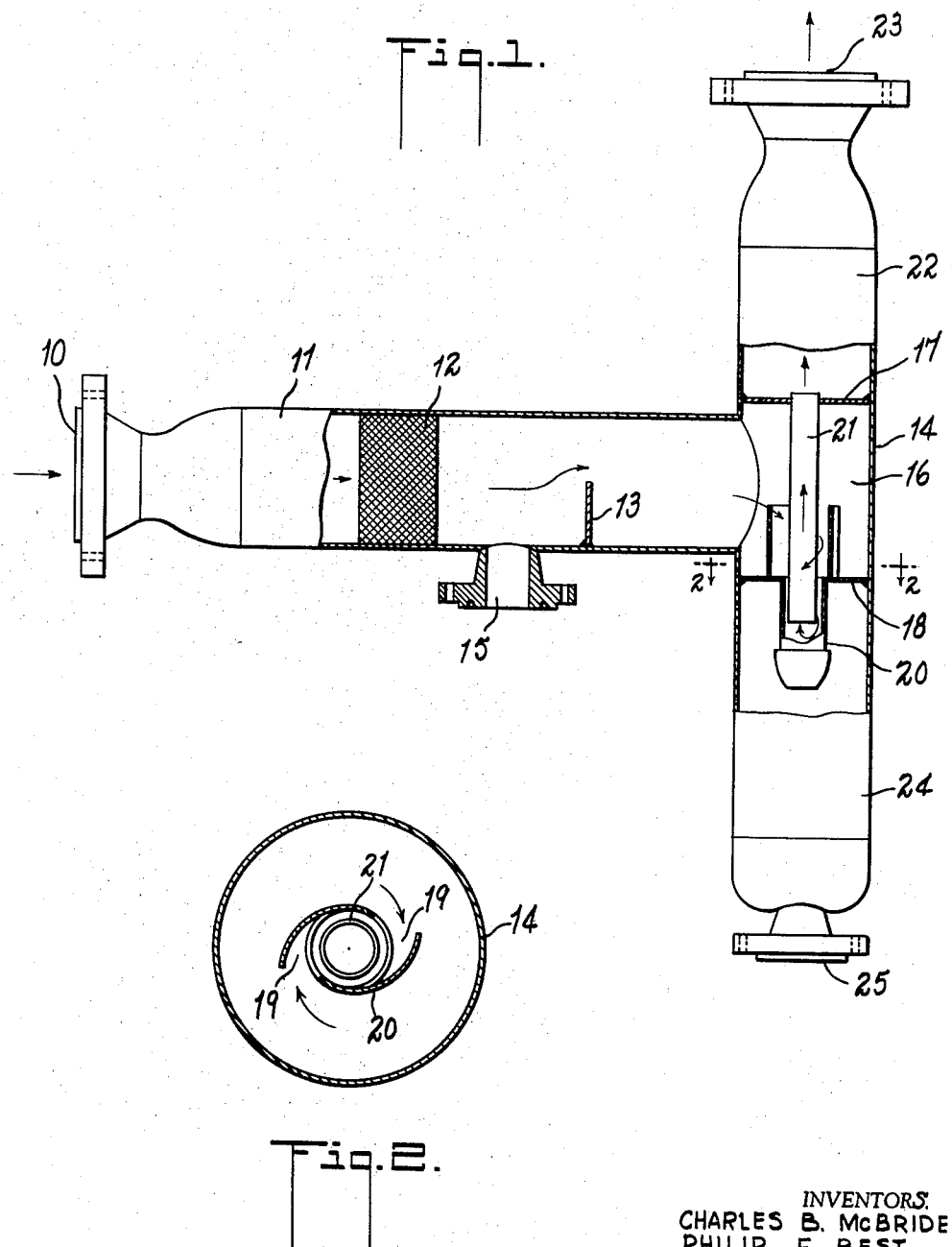

2,848,060

APPARATUS FOR SEPARATING MIST PARTICLES OR DROPLETS FROM GASES

Charles B. McBride, Port Chester, N. Y., and Philip F. Best, Riverside, Conn., assignors to The Thermix Corporation, Greenwich, Conn., a corporation of Connecticut Application September 13, 1956, Serial No. 609,719

3 Claims. (Cl. 183—34)

Our invention relates to apparatus for separating mist particles or droplets from gases, particularly from natural gas. It may also be used for separating mists of various kinds from air or other gases.

Multitube centrifugal separators have been used for separating suspended mist particles from natural gas. There are, however, some mists which, due to some characteristics of the mist not entirely known, are very difficult to separate and collect by centrifugal means alone. One of these mists is an amine mist formed in natural gas conditioning plants where an amine is used to remove the sulphur content of "sour" gas to make it acceptable for consumption. Also difficult to separate and collect are mist particles having diameters of less than one micron, which are too small to separate in centrifugal separators.

In our co-pending application Ser. No. 438,382, filed June 22, 1954, now Patent No. 2,792,075, we have disclosed apparatus for separating mists of the above type, using a pad of knitted metal filaments through which the mist laden gas is passed and in which the mist particles are agglomerated, and a number of centrifugal separators through which the gas and agglomerated, suspended, particles pass in parallel. The agglomerated particles are of sufficient size to be readily separated from the gas in the centrifugal separators. The apparatus of the above application is, however, of such nature that only gases in large volume, that is, a large volume per second of flow, can be efficiently treated therein.

Our present invention provides apparatus of smaller size and of simple construction in which gases may be treated in smaller quantity or smaller rate of flow as, for example, down to a volume or rate of flow that can be treated efficiently with a single centrifugal separator of small size.

In our present invention we provide a separator having a vertical shell, preferably of cylindrical cross section, having a pair of vertically spaced, horizontal or transverse, partitions which divide the shell into a plenum chamber between the partitions, an offtake chamber above the upper partition for the offtake of cleaned gas and a sump chamber below the lower partition for receiving the separated liquid. A centrifugal separator is mounted in the shell with a separating tube mounted in the lower partition and having rotatory inlets in the plenum chamber and a liquid outlet in the sump chamber. An open ended offtake tube is mounted in the upper partition to extend co-axially into the separating tube, forming an annular passage for entering gases and having its discharge end in the off-take chamber.

A horizontal shell, also preferably of cylindrical section, is joined to the vertical shell to deliver into the plenum chamber and has an inlet at its free end. A vertical partition of layers of knitted, metallic, filament or wire spans the horizontal shell at a short distance from the inlet so that the particle carrying gas must pass through the meshes of the partition in which they will be agglomerated into larger particles.

Some of the agglomerated particles may be of sufficient size to settle to the bottom of the horizontal shell, which forms an agglomerating chamber, and are drawn off through an outlet while the rest are torn from the meshes of the partition and carried to the plenum chamber. To insure against any flow of separated liquid into the plenum chamber, a dam may be provided between the outlet and the plenum chamber.

The partition of wire mesh is the same as, or similar to, that used in the above mentioned co-pending application consisting of a pad of layers of knitted metal wire. Each layer is a sheet of inter-knitted loops of about ¼ inch diameter. The layers are placed in contact with each other to form tortuous passages. For a cylindrical chamber the partition is preferably formed by rolling a strip of the knitted wire of about four inches in width into a roll of the diameter of the chamber.

The various features of our invention are illustrated by way of example in the accompanying drawings, in which:

Fig. 1 is a vertical section of apparatus embodying a preferred form of the invention, and, Fig. 2 is a section of the apparatus taken on line 2—2 of Fig. 1.

In the embodiment of Fig. 1, the mist laden gas enters through an inlet end 10 into a horizontal shell 11 which forms the agglomerating chamber. The gas then passes through a partition 12 of closely packed layers of knitted metallic wire such as that described above, thence over a dam or baffle 13 and thence into a vertical shell 14. Liquid that separates from the gas and settles in the shell 11 may be drawn off through an outlet 15.

The gas entering the shell 14 and carrying in suspension the agglomerated mist particles is received in a plenum chamber 16 formed between an upper partition 17 and a lower partition 18. From the plenum chamber the gas and suspended, agglomerated particles pass through rotatory inlets 19, Fig. 2, in the upper closed end of a centrifugal tube 20 which is mounted in and extends through the lower partition 18. As the gas passes through the inlets 19 it is given a motion of rotation about an off-take tube 21 in an annular passage between the centrifugal tube 20 and the off-take tube 21 and passes downwardly in a helical path through this passage. The offtake tube is open at both ends and as the gas reaches the lower end of the off-take tube it reverses its downward movement and enters the tube. Thence it passes upwardly to an off-take chamber 22 and is withdrawn through an outlet 23.

In the passage of the gas through the annular passage between the tube 20 and off-take pipe 21 the agglomerated mist particles are thrown outwardly to, and collect on the inner surface of the tube 20 and then flow downwardly through the lower open end of the tube into a collecting sump 24 formed below the partition 18, from whence the collected liquid my be drawn off through a withdrawing outlet 25.

In our present invention, one or a small number of tubes may be used to separate the mist from the gas as conditions may require. The apparatus is of simple construction requiring but the two cylindrical shells welded or otherwise integrally united, into which the partitions, centrifugal separator and agglomerating partition may be mounted.

Having described our invention, what we claim is:

1. Apparatus for separating suspended mist particles from a gas which comprises a substantially horizontal cylindrical agglomerating chamber having an inlet at one end and a liquid outlet in the lower part of said chamber intermediate its ends, a vertical separating chamber at the end of said agglomerating chamber opposite said inlet joined fluid tightly to said end of the agglomerating chamber, said agglomerating chamber opening to said separating chamber, a partition of contacting layers of knitted metallic wire spanning said agglomeraing chamber between said inlet end and said liquid outlet, a dam extending upwardly from the bottom of said agglomerating chamber between said liquid outlet and the separating chamber, and upper partition in said separating chamber above its junction with the agglomerating chamber, a lower partition in said separating chamber below said junction and a centrifugal separating tube in said separating chamber having a gas outlet extending through said upper partition and having a liquid discharge end extending through said lower partition.

2. The apparatus of claim 1 in which said centrifugal tube has an off-take pipe co-axial with the tube and spaced from it to form an annular passage and in which said tube has rotatory inlets to said annular passage.

3. Apparatus for separating suspended mist particles from gas which comprises a substantially horizontal elongated agglomerating chamber having an inlet at one end, a vertical separating chamber at the end of said agglomerating chamber opposite said inlet joined fluid tightly to said end of the agglomerating chamber, said agglomerating chamber opening to said separating chamber, a partition of contacting layers of knitted metallic fabric spanning said agglomerating chamber between said inlet end and said separating chamber, an upper partition in said separating chamber above its junction with the agglomerating chamber, a lower partition in said separating chamber below said junction, and a centrifugal separating tube in said separating chamber having a gas outlet extending through said upper partition and having a liquid discharge end extending through said lower partition.

References Cited in the file of this patent

UNITED STATES PATENTS

| 1,379,056 | Smith | May 24, 1921 |
| 1,463,990 | Wilson | Aug. 7, 1923 |
| 1,544,950 | Smith | July 7, 1925 |
| 2,117,718 | Hawley | Mar. 17, 1938 |
| 2,349,944 | Dixon | May 30, 1944 |
| 2,514,623 | Brown | July 11, 1950 |
| 2,521,785 | Goodloe | Sept. 12, 1950 |
| 2,547,769 | Packie | Apr. 3, 1951 |
| 2,661,076 | Walker | Dec. 1, 1953 |
| 2,667,944 | Crites | Feb. 2, 1954 |
| 2,745,513 | Massey | May 15, 1956 |

FOREIGN PATENTS

| 297,394 | Switzerland | June 1, 1954 |